US012050996B2

(12) United States Patent
Vainsencher et al.

(10) Patent No.: US 12,050,996 B2
(45) Date of Patent: Jul. 30, 2024

(54) QUBIT CALIBRATION

(71) Applicant: Google LLC, Mountain View, CA (US)

(72) Inventors: Amit Vainsencher, Goleta, CA (US); Julian Shaw Kelly, Santa Barbara, CA (US)

(73) Assignee: Google LLC, Mountain View, CA (US)

(*) Notice: Subject to any disclaimer, the term of this patent is extended or adjusted under 35 U.S.C. 154(b) by 934 days.

(21) Appl. No.: 16/771,570

(22) PCT Filed: Dec. 14, 2017

(86) PCT No.: PCT/US2017/066436
§ 371 (c)(1),
(2) Date: Jun. 10, 2020

(87) PCT Pub. No.: WO2019/117922
PCT Pub. Date: Jun. 20, 2019

(65) Prior Publication Data
US 2020/0394524 A1 Dec. 17, 2020

(51) Int. Cl.
*G06N 3/084* (2023.01)
*G06N 3/045* (2023.01)
(Continued)

(52) U.S. Cl.
CPC ............. *G06N 3/084* (2013.01); *G06N 3/045* (2023.01); *G06N 7/01* (2023.01); *G06N 10/00* (2019.01); *G06N 10/40* (2022.01); *G06N 10/60* (2022.01)

(58) Field of Classification Search
CPC ........ G06N 3/084; G06N 10/00; G06N 10/40; G06N 10/60; G06N 7/01; G06N 3/045
See application file for complete search history.

(56) References Cited

U.S. PATENT DOCUMENTS

2012/0185851 A1* 7/2012 Zhang ................... G06F 9/5083
718/1
2012/0254586 A1* 10/2012 Amin ..................... G06N 10/00
712/E9.002

(Continued)

FOREIGN PATENT DOCUMENTS

CN 101375302 2/2009
CN 101548288 9/2009

(Continued)

OTHER PUBLICATIONS

Wikipedia. Backpropagation. Article version from Dec. 26, 2015. https://en.wikipedia.org/w/index.php?title=Backpropagation& oldid=696869543. Accessed May 12, 2023. (Year: 2015).*

(Continued)

Primary Examiner — Markus A. Vasquez
(74) Attorney, Agent, or Firm — Fish & Richardson P.C.

(57) ABSTRACT

A method comprises causing a plurality of qubit calibration procedures to be performed on one or more qubits in accordance with an automatic qubit calibration process. Log data is stored comprising at least: a record identifying one or more calibration procedures that have been performed, and information relating to the result of the respective calibration procedures. Training data is selected from the log data and is received at a learning module operating at one or more computing devices. A supervised learning model is trained at the learning module to select qubit parameters to be calibrated and/or checked.

19 Claims, 8 Drawing Sheets

(51) Int. Cl.
*G06N 7/01* (2023.01)
*G06N 10/00* (2022.01)
*G06N 10/40* (2022.01)
*G06N 10/60* (2022.01)

(56) References Cited

U.S. PATENT DOCUMENTS

| | | |
|---|---|---|
| 2014/0229722 A1 | 8/2014 | Harris |
| 2015/0317558 A1 | 11/2015 | Adachi et al. |
| 2016/0055421 A1 | 2/2016 | Adachi et al. |
| 2017/0017894 A1 | 1/2017 | Lanting et al. |
| 2017/0255629 A1* | 9/2017 | Thom .................... G06N 10/00 |
| 2019/0034764 A1* | 1/2019 | Oh .......................... G06N 7/01 |
| 2019/0146469 A1* | 5/2019 | Matei ................. G05B 13/0265 706/12 |

FOREIGN PATENT DOCUMENTS

| | | | |
|---|---|---|---|
| CN | 104335074 | 2/2015 | |
| KR | 1020190013011 | * 10/2019 | .............. G06N 3/08 |
| WO | WO2017027185 | 7/2017 | |

OTHER PUBLICATIONS

Mavadia, Sandeep, et al. "Prediction and real-time compensation of qubit decoherence via machine learning." Nature communications 8.1 (2017): 14106. (Year: 2017).*

Kelly, Julian, et al. "Physical qubit calibration on a directed acyclic graph." arXiv preprint arXiv:1803.03226 (2018). (Year: 2018).*

Notice of Allowance in Australian Appln. No. 2021232777, dated Dec. 21, 2022, 3 pages.

EP Office Action in European Application No. 17826068.3, dated Jul. 1, 2021, 10 pages.

AU Office Action in Australian Application No. 2017442682, dated Oct. 29, 2020, 4 pages.

Kelly et al., "Scalable in-situ qubit calibration during repetitive error detection", arXiv:1603.03082v1, Mar. 2016, 8 pages.

Mavadia et al., "Prediction and real-time compensation of qubit decoherence via machine learning", Nature Communications, Jan. 2017, 8:2-3.

PCT International Preliminary Report on Patentability in International Appln. No. PCT/US2017/066436, dated Jun. 25, 2020, 11 pages.

PCT International Search Report and Written Opinion in International Appln. No. PCT/US2017/066436, dated Sep. 3, 2018, 18 pages.

AU Office Action in Australian Appln. No. 2021232777, dated Sep. 23, 2022, 3 pages.

CA Office Action in Canadian Application No. 3,085,717, dated Aug. 18, 2021, 5 pages.

Office Action in European Appln. No. 17826068.3, dated Jul. 13, 2023, 11 pages.

Office Action in Australian Appln. No. 2023202257, mailed on Nov. 10, 2023, 2 pages.

Office Action in Chinese Appln. No. 201780097739.0, dated Mar. 31, 2023, 27 pages (with English translation).

Notice of Allowance in Australian Appln. No. 2023202257, mailed on Nov. 23, 2023, 3 pages.

Notice of Allowance in Chinese Appln. No. 201780097739.0, mailed on Dec. 27, 2023, 6 pages (with English translation).

* cited by examiner

QUBIT CALIBRATION

This application is a National Stage Application under 35 U.S.C. § 371 and claims the benefit of International Application No. PCT/US2017/066436, filed Dec. 14, 2017, the disclosure of which is incorporated herein by reference.

This specification relates to quantum computing. In particular, it relates to the use of a supervised machine learning model to optimize qubit calibration.

Computation on a quantum computer can be realized by manipulating physical quantum bits (qubits). However in order to operate a physical qubit in a useful capacity, many parameters relating to the qubit may need to be calibrated. Various techniques have been developed to calibrate such parameters.

In one example aspect, the present specification describes a method comprising performing a plurality of qubit calibration procedures in accordance with an automatic qubit calibration process. As the qubit calibration procedures are performed, log data is maintained comprising at least: a record identifying one or more calibration procedures that have been performed, and information relating to the result of the respective calibration procedures. Training data selected from the log data is received at a learning module operating at one or more computing devices. At the learning module, a supervised learning model is trained using the training data that has been selected from the log data. In particular, the supervised learning model is trained to select qubit parameters to be calibrated and/or checked.

A supervised learning model trained in this way may speed up calibration times, since it may be capable of "jumping" directly to qubit parameters that may need to calibrated without the need to carry out diagnostic procedures. In this way unnecessary experiments and data processing may be avoided. This results in a technical improvement in the field of quantum computing.

In various example implementations, the method may further comprise selecting one or more qubit parameters using the supervised learning model. In some examples, the automatic qubit calibration process may be operated in accordance with a graph comprising a plurality of nodes and directed edges, wherein each node of the graph relates to at least one qubit parameter, and wherein each edge defines a dependency of one node on another, wherein selecting a qubit parameter comprises selecting a node of the graph.

So that the invention may be more easily understood, embodiments thereof will now be described, by way of example only, with reference to the accompanying figures, in which.

Figure 1:
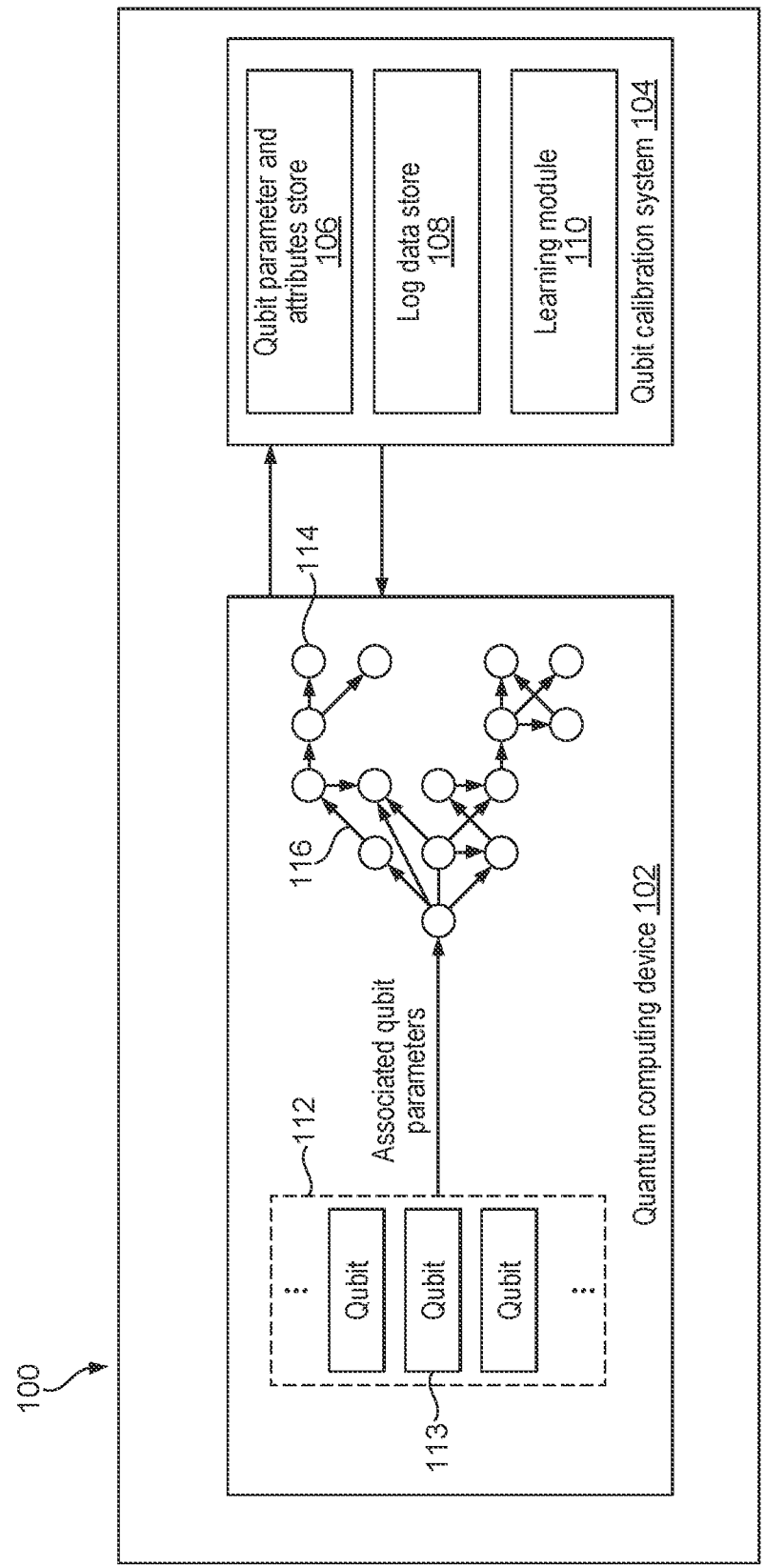
FIG. 1 depicts an example system for automatic qubit calibration.

FIG. 1 depicts an example system 100 for automatic qubit calibration. As shown, the system includes a quantum computing device 102 and a qubit calibration system 104 in communication with the quantum computing device 102. The qubit calibration system 104 includes a qubit parameter and attributes data store 106, a log data store 108, and a learning module 110.

The quantum computing device 102 includes one or more qubits 112. The one or more qubits may be used to perform algorithmic operations or quantum computations. The specific realization of the one or more qubits depends on the type of algorithmic operations or quantum computations that the quantum computing device is performing. For example, the qubits may include qubits that are realized via atomic, molecular or solid-state quantum systems. In other examples the qubits may include, but are not limited to, superconducting qubits or semi conducting qubits. For clarity, three qubits are depicted in FIG. 1, however the system may include a larger number of qubits.

Each qubit may be associated with multiple parameters. Qubit parameters may include values used in a parameterized quantum gate, e.g., voltage amplitude for a pi pulse or frequency of a readout pulse. For example, to tune a superconducting qubit, e.g., dispersively coupled to a readout resonator, using pi and pi/2 rotations and single shot readout to discriminate between the 0 and 1 states, the superconducting qubit may be associated with multiple parameters including: readout pulse frequency, readout pulse length, readout pulse power, readout discrimination threshold to discriminate between the 0 and 1 states based on the readout signal, pi rotation qubit frequency, pi/2 rotation qubit frequency, pi pulse length, pi/2 pulse length, pi pulse amplitude and pi/2 pulse amplitude. Some or all of the parameters associated with a qubit may require experimental determination. For example, in the above list of qubit parameters, the readout pulse frequency, readout pulse power, readout discrimination threshold to discriminate between the 0 and 1 states based on the readout signal, pi rotation qubit frequency, pi/2 rotation qubit frequency, pi pulse amplitude and pi/2 pulse amplitude may require experimental determination. Other parameters may be set a priori.

It will be understood that as used herein, the term "qubit parameter" refers to any parameter associated with a qubit, including qubit control parameters relating to e.g. qubit control hardware and/or qubit measurement hardware.

The multiple qubit parameters may in turn be associated with one or more parameter attributes. The parameter attributes are dependent on the physical realization of the respective qubit. For example, the parameter attributes for a qubit parameter may include acceptable values of the qubit parameter, e.g., acceptable values used in a parameterized quantum gate. If a qubit parameter value is determined to be an acceptable value, or if the qubit parameter value is determined to lie within a tolerance value of what is accepted, the qubit parameter may be determined as being within specification. If a qubit value is determined to be an unacceptable value, the qubit parameter may be determined as being out of specification. For example, a pi pulse parameter may be determined to be in specification if the rotation angle is within the tolerance value of 1% of a 180 degree rotation. A qubit parameter that is out of specification may require calibration in order to ensure that the qubit parameter is within specification.

In another example, the parameter attributes for a qubit parameter may include a measure of the stability of the parameter, or the drift time of the parameter. After calibration, a qubit parameter may naturally drift out of specification due to external factors such as temperature. The parameter attributes may therefore include a respective timeout period which indicates a time period for which a parameter value should be checked or calibrated.

As another example, the parameter attributes for a qubit parameter may include the dependencies of a qubit parameter on other qubit parameters. A qubit parameter may depend on at least one other qubit parameter and the calibration of the at least one other qubit parameter. For example, the qubit may be an atom and the parameters of the qubit may be calibrated using Rabi driving. There may be a number of parameters which must be previously calibrated for Rabi driving to run correctly. For example, Rabi driving may need to be performed at the qubit frequency, which must be determined in a different experiment, and the qubit state must be measured using a readout operation which must itself be calibrated. Hence, before a Rabi driving calibration is performed, it may be necessary to perform a qubit frequency calibration procedure to determine the frequency at which to drive the qubit, as well as one or more calibrations to calibrate the readout operation.

As described in more detail below, an automatic procedure may be used to determine the sequence of calibration procedures to perform to check and update various qubit parameters, taking into account dependencies between qubit parameters and allowing for the possibility of parameter drift.

An individual qubit calibration procedure may comprise a test and/or experiment to check whether a qubit parameter is within specification, or it may comprise an experiment to determine new value(s) for qubit parameter(s). For example, one type of qubit calibration procedure comprises a calibration test to determine whether a parameter is in or out of specification. As described in more detail below, a calibration test may be a low cost test that may be used to determine a current state of the parameter, and in turn the current state of the system, by investigating the qubit parameter and previous calibrations. Another type of qubit calibration procedure comprises a first calibration experiment which, as described in more detail below, runs an ensemble of experiments and uses data from the ensemble of experiments to determine the state of calibration. Yet another type of calibration procedure comprises a second calibration experiment which, as described in more detail below, runs an ensemble of experiments and uses the data from the experiments to update the parameter associated with the node. In the second calibration experiment, a value for a qubit parameter may be fitted to the data from the experiment, using a fitter algorithm, based on a physical or heuristic model. A stored value for the qubit parameter may be updated, based on the fitted value.

Recording Log Data

As various qubit calibration procedures are performed to check and/or update qubit parameters, log data may be recorded in log data store 108. The log data which is recorded may record which calibration procedures have been performed, including which qubit parameters were checked or updated and which type of calibration procedure were performed, as well as the order in which calibration procedures were performed, and the results of the calibration procedures such as an indication of whether measured values were in specification, whether parameters were updated and if so how much updated parameters modified the previously stored values. Various other information relating to the calibration procedures may also be logged, for example including some or all of the measurement data which may have been obtained during a calibration procedure, and the times at which calibration procedures were carried out.

As will be described in more detail below, the purpose of recording log data is to provide training data for training a supervised machine learning algorithm to optimize the selection of qubit parameters to be calibrated and/or checked.

Log data may be recorded during operation of an automatic process which automatically determines the sequence of qubit calibration procedures that is performed. In some examples, the automatic qubit calibration process may be operated in accordance with a directed graph comprising a plurality of nodes and directed edges, wherein each node 114 of the graph relates to a qubit parameter or a group of related qubit parameters. The graph may encode the dependencies of a qubit parameter on other qubit parameters by defining a directed edge for each dependency, e.g. edge 116. For example, for a superconducting qubit as described above, the readout threshold parameter to discriminate between the 0 and 1 state may be represented by a node that is connected to a node representing a pi pulse parameter with a directed edge indicating that the readout threshold parameter is dependent on the pi pulse parameter. As another example, a node that requires a pi pulse will be connected to a node that calibrated the pi pulse amplitude, since a node that requires a pi pulse may depend on a node that calibrates the pi pulse amplitude. Each node in the directed graph may have at least one associated parameter and one or more associated experiments that may be used to determine a correct value for the parameter associated with the node. As depicted in FIG. 1, qubit 113 may be associated with a number of qubit parameters, e.g., qubit parameter 114. For clarity a restricted number of qubit parameters, e.g., qubit parameter 114, are shown, however a qubit may be associated with a smaller or larger number of qubit parameters.

The directed graph may include one or more root node, e.g., nodes with no dependencies, which define a root or "ancestor" direction of the graph, e.g., the direction towards the root nodes with no dependencies, and a leaf or "child" direction of the graph, e.g., towards nodes that are dependent or deeper in the graph.

The qubit calibration system 104 may include a classical or quantum processing device and communicates with the quantum computing device 102. The qubit calibration system 104 may be configured to obtain a set of qubit parameters and data describing one or more attributes of the parameters in the set of qubit parameters, including dependencies of qubit parameters on one or more other qubit parameters in the set of qubit parameters, wherein the parameters and their dependencies on one another may be represented by a directed graph comprising a node for each parameter and a directed edge for each dependency. The qubit calibration system 104 may optionally store the data describing the one or more attributes of the parameters in the set of qubit parameters in a data store, e.g., qubit parameter and attributes data store 106. In some implementations the qubit calibration system 104 may receive some or all of the data describing the one or more attributes of the parameters in the set of qubit parameters from a third party external to the automatic qubit calibration system 100, e.g., through user input.

The qubit calibration system 104 may use the data describing the one or more attributes of the parameters in the set of qubit parameters to automatically calibrate the qubit parameters. For example, the qubit calibration system 104 may be configured to identify a qubit parameter, e.g., a qubit parameter that corresponds to a root node of the directed graph, select a set of qubit parameters that includes the identified qubit parameter and one or more dependent qubit parameters, e.g., the qubit parameter that corresponds to the selected node and the qubit parameters of each descendant node. The set of qubit parameters may be ordered, e.g., according to a node ancestry ordering. The qubit calibration system 104 may calibrate the parameters in the set of qubit parameters in sequence according to the ordering. A process used by the qubit calibration system 104 to perform these operations is described in more detail below with reference to FIGS. 2, 3 and 4.

The qubit calibration system 104 may be configured to perform calibration tests and calibration experiments on qubit parameters, e.g., qubit parameter 114, in order to calibrate the qubit parameters of the one or more qubits 112 included in the quantum computing device 102, e.g., qubit 113. A calibration experiment may include a single, static set of waveforms, where a single experiment may be repeated N times to gather and log statistics on a probability distribution of a final qubit state after the experiment. For example, a calibration experiment may include performing a pi pulse followed by a readout pulse. A calibration experiment may also include an ensemble of experiment where waveforms are altered from experiment to experiment. An example ensemble of experiments includes a Rabi scan, e.g., a series of experiments consisting of a rotation pulse followed by a readout pulse, where each experiment would have a different amplitude for the rotation pulse. Such an ensemble of experiments could be used to determine a relationship between rotation amplitude and qubit state. Performing calibration tests and calibration experiments on qubit parameters is described in more detail below with reference to FIGS. 3 and 4.

Figure 2:
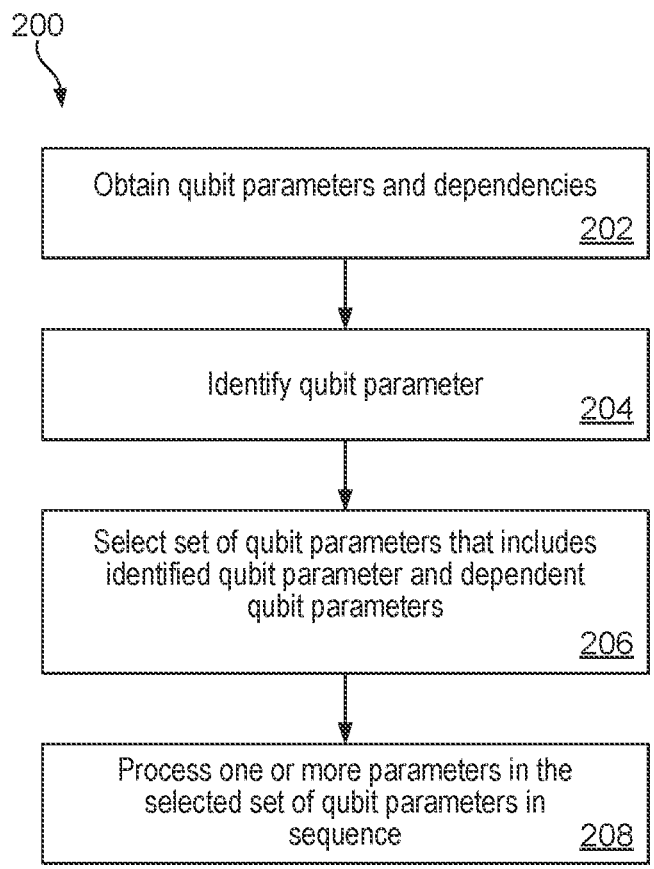
FIG. 2 is a flowchart of an example process for automatic qubit calibration.

FIG. 2 is a flowchart of an example process 200 for automatic qubit calibration. For convenience, the process 200 will be described as being performed by a system of one or more classical or quantum computing devices located in one or more locations. For example, a qubit calibration system, e.g., the qubit calibration system 104 and of FIG. 1, appropriately programmed in accordance with this specification, can perform the process 200.

The system obtains multiple qubit parameters and data describing dependencies of the multiple qubit parameters on one or more other qubit parameters (step 202). The data may also include data describing one or more attributes of the multiple parameters. The parameters and their dependencies on one another may be represented by a directed graph including a node for each parameter and a directed edge for each dependency. The directed edges for each dependency indicate a dependence of a node on a successful calibration of previous nodes. For example, a node corresponding to a pi pulse may depend on a successful calibration of at least the pi pulse amplitude. In some examples, the directed graph may include a node for multiple parameters and calibrations of related parameters are to be calibrated simultaneously.

In some implementations the directed graph may be acyclic. For example, the directed graph may be a tree with a root node and one or more descendant nodes that are reached by proceeding from parent nodes to child nodes. In other implementations the directed graph may be cyclic, for example when there are one or more co-dependent parameters.

The one or more attributes of the parameters in the obtained set of qubit parameters may further include (i) a respective timeout period for which a calibration is to be performed, and (ii) acceptable thresholds for parameter values. For example, a timeout period for which a calibration is to be performed may be determined based on the "drift time" of the parameter, that is a length of time in which the value of the parameter remains stable and does not drift out of specification. Acceptable thresholds for parameter values may vary according to the parameter type. For example, an acceptable threshold for a pi pulse may be within 1% of a 180 degree rotation. The acceptable thresholds for parameter values may be used to determine whether a parameter is out of specification, e.g., whether a measurement of a parameter is producing noise.

The system identifies a qubit parameter (step 204). For example, the identified qubit parameter may be a qubit parameter that corresponds to a root node of the directed graph. For example, the directed graph may have one root node that is selected. In other examples the directed graph may have multiple root nodes. In such a case the system may repeatedly select one of the qubit parameters that corresponds to a root node and perform the process 200 for each selected qubit parameter that corresponds to a root node. In further examples the identified qubit parameter may correspond to a most root node that has failed a calibration test, as described in more detail below.

The system selects a set of qubit parameters that includes the identified qubit parameter and one or more dependent qubit parameters (step 206). For example, the set of qubit parameters may include the identified qubit parameter that corresponds to the identified node and the qubit parameters of each descendant node. The set of qubit parameters may be ordered, e.g., according to a node ancestry ordering, that is the set of qubit parameters may be ordered in a sequence proceeding through the node dependencies, beginning with the identified root node and ending with the youngest child.

For example, if the directed graph is acyclic and includes nodes A, B, C and D, where A is the root node, node B depends on node A and nodes C and D depend on node B, the selected set of qubit parameters with node ancestry ordering may be {A, B, C, D}. In this example, an equivalent node ancestry ordering may be {A, B, D, C}.

In some implementations the directed graph is cyclic and the number of iterations between co-dependent parameters in the selected set of qubit parameters is capped to a predetermined threshold. For example, if the directed graph is cyclic and includes nodes A, B, and C, where A is the root node, node B depends on node A and node C, and node C depends on node B, in principle the number of iterations between the co-dependent parameters B and C could be indefinite, that is the selected set of qubit parameters with node ancestry ordering could be an infinite set {A, B, C, B, C, B, C, B, C, . . . }. In this situation, the system creates levels of optimization and caps the number of iterations between co-dependent parameters to a predetermined threshold. For example, the number of iterations may be capped to two and the selected set of qubit parameters with node ancestry ordering may be {A, B, C, B, C}.

The system processes one or more parameters in the set of qubit parameters in sequence according to the data describing the dependencies (step 208). In some implementations the system processes each of the parameters in the set of qubit parameters in sequence. For example, if the directed graph is acyclic and includes nodes A, B, C and D, where A is the root node, node B depends on node A, and both nodes C and D depend on node B, the system may calibrate each parameter corresponding to nodes A, B, C and D in the set of qubit parameters {A, B, C, D} in sequence according to the ordering A, B, C, D. Processing a qubit parameter in a set of qubit parameters in sequence according to an ordering is described in more detail below with reference to FIGS. 3 and 4.

Figure 3:
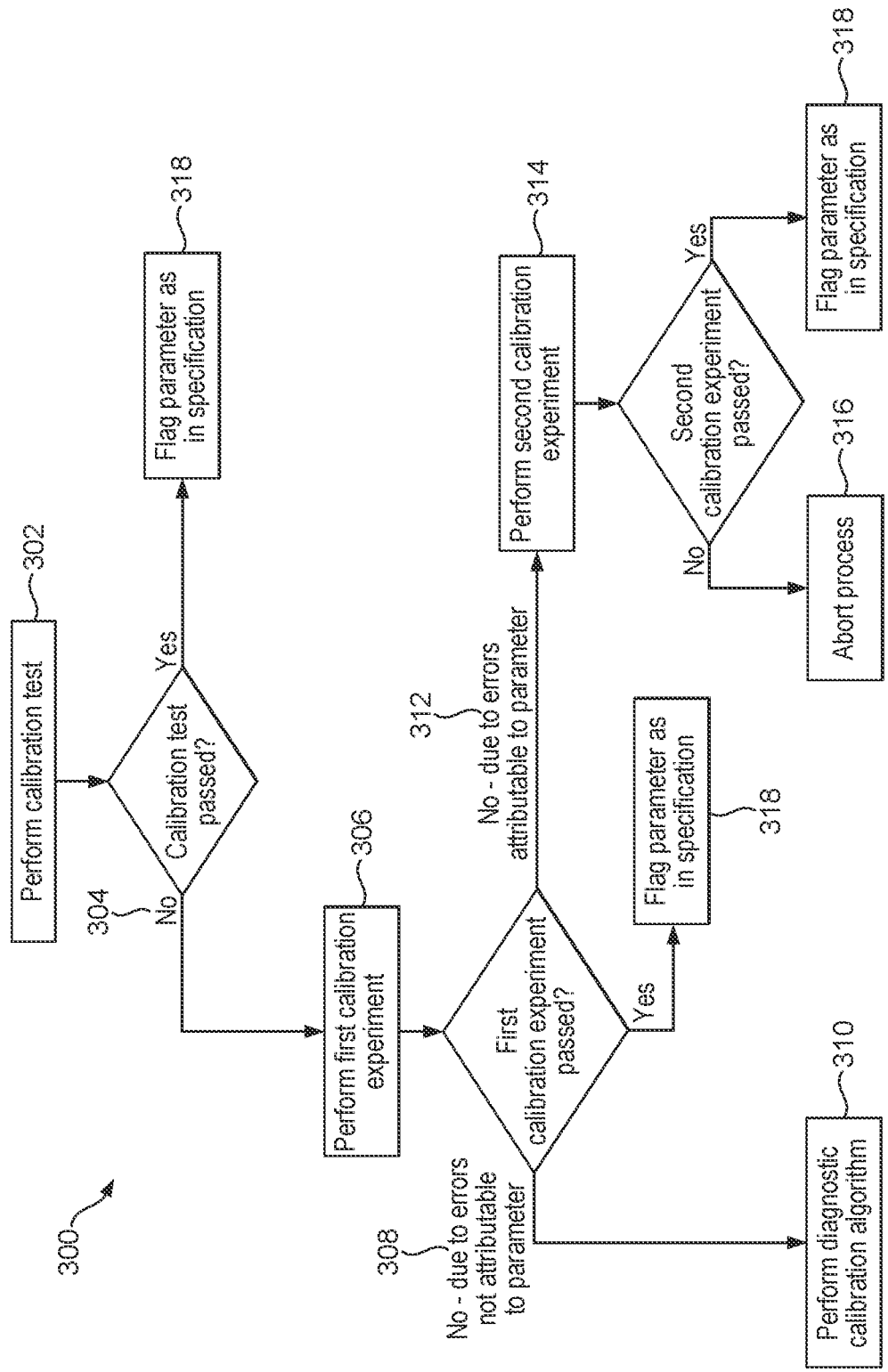
FIG. 3 is a flow diagram of an example qubit maintenance process for processing parameters in a set of qubit parameters in sequence.

FIG. 3 is a flow diagram of an example qubit maintenance process 300 for processing a parameter in a set of qubit parameters. The qubit maintenance process 300 may be performed for one or more parameters in a set of qubit parameters in sequence according to a qubit parameter ordering. Log data may be recorded during the process, e.g. to record which calibration procedures have been performed, including which qubit parameters were checked or updated and which type of calibration procedure were performed, as well as data obtained during the calibration procedures.

For convenience, the process 300 will be described as being performed by a system of one or more classical or quantum computing devices located in one or more locations. For example, a qubit calibration system, e.g., the qubit calibration system 104 and of FIG. 1, appropriately programmed in accordance with this specification, can perform the process 300. The example process 300 may be considered a depth-first, recursive method of traversing a directed graph that represents qubit parameters and their dependencies, e.g., the process may be invoked on a node in a "leaf" or "child" direction of the graph that is to be calibrated. The process may then start investigating the node in the most "root" direction that may be likely to be out of specification based on information regarding the recent and current status of the system, and works towards the node that originally had the process invoked on it. In some examples, the process 300 may be performed as an initial system calibration, since the process naturally moves in the order of least dependent towards a most dependent node, or in some cases it may be performed when a system has been idle sometime after a recent calibration.

The system performs a calibration test on the qubit parameter (step 302). The calibration test determines whether the parameter is in or out of specification. The calibration test may include a set of metadata associated with the directed graph, and may not include performing an experiment on the qubit parameter. Rather, the calibration test may be a low cost test that may be used to determine a current state of the parameter, and in turn the current state of the system, by investigating the qubit parameter and previous calibrations. In some implementations the calibration test may include pass and fail criteria for determining when a parameter is out of specification. For example, a calibration test on a qubit parameter may pass if a successful calibration experiment has been performed on the parameter within a respective timeout period. Calibration experiments are described in detail below with reference to steps 306 and 314. In another example, a calibration test may fail if the parameter has been flagged as having failed a calibration experiment. In a further example, a calibration test may fail if a parameter dependence has been recalibrated within a predetermined amount of time, e.g., if an ancestor parameter, that is a parameter on which a current parameter depends, has been recalibrated since the current parameter itself was calibrated. As another example, a calibration test may fail if the parameter dependence has been altered within a predetermined amount of time, e.g., if the parameter now depends on a different parameter. In addition, a calibration test may fail if a parameter that depends on the parameter has failed a calibration test. The results of the calibration test may be stored in the log data store 108.

The system performs a first calibration experiment or a diagnostic calibration algorithm on the parameter when the calibration test fails. For a parameter in the set of qubit parameters for which the calibration test fails (step 304), the system performs a first calibration experiment on the parameter (step 306). A first calibration experiment may include a method on a node that runs an ensemble of experiments and uses data from the ensemble of experiments to determine a state of calibration. For example, a first calibration experiment may include one or more qubit experiments with respective measurement outcomes that are used to determine whether a parameter value is out of specification. The first calibration experiment may be a low cost ensemble of experiments, where an experiment may include an input waveform and an output of measured qubit states after applying the waveform. The first calibration experiment may be used to determine whether the qubit requires a full calibration. For example, a first calibration experiment may fail if a measurement outcome of a corresponding qubit experiment indicates parameter values that are out of specification. For example, a parameter value may be out of specification if the first calibration experiment returns noise and not an expected measurement result. Generally, a first calibration experiment may be used to answer questions about a qubit parameter, such as: is the parameter in specification? Is the first calibration experiment functioning correctly, e.g., is an ensemble of experiments functioning accurately? The results of the first calibration experiment may be stored in the log data store 108.

For a parameter in the set of qubit parameters for which the first calibration experiment fails due to errors that are not attributable to the parameter (step 308), the system performs a diagnostic calibration algorithm on the set of qubit parameters (step 310). Errors that are not attributable to the parameter may include errors that are attributable to ancestor parameters. For example, if a parameter requires a pi pulse but a parameter on which it depends does not have a calibrated pi pulse amplitude, the parameter that requires a pi pulse may fail the first calibration experiment due to the out of specification pi pulse amplitude. Performing a diagnostic calibration algorithm on a set of qubit parameters is described in more detail below with reference to FIG. 4.

For a parameter in the set of qubit parameters for which the first calibration experiment fails due to errors that are attributable to the parameter (step 312), the system performs a second calibration experiment on the parameter (step 314). Errors that are attributable to the parameter may include drift in the control electronics or device parameters, or an ancestor parameter changing the optimal value for this parameter, e.g., the pi amplitude may change for these reasons.

A second calibration experiment may include a method on a node representing a parameter that runs an ensemble of experiments and uses the data from the experiments to update the parameter associated with the node. In some implementations the second calibration experiment is the only experiment that alters the metadata associated with the directed graph. A second calibration experiment may include one or more qubit experiments with respective measurement outcomes that are used to update the value of a parameter. The second calibration experiment may be a high cost ensemble of experiments that are used to determine a new value for the qubit parameter. The output of a second calibration experiment may be interpreted as updating a qubit parameter value. The second calibration experiment may require more time or more hardware to complete than the first calibration experiment, e.g., a first calibration experiment is of lower cost than a second calibration experiment.

For a parameter in the set of qubit parameters for which the second calibration experiment fails, the system aborts the processing of the parameters in the set of qubit parameters (step 316).

For a parameter in the set of qubit parameters that passes any of the calibration test (as described in step 302), first calibration experiment (as described in step 306) or second calibration experiment, the system flags the parameter as a parameter that is within specification (step 318), that is the value of the parameter is acceptable and does not require further action/calibration. In this situation, the system may return to step 208 described above with reference to FIG. 2, and select the next parameter in the set of qubit parameters in sequence according to the ordering. For example, if it is determined at step 318 that the qubit parameter corresponding to node A in the sequence of nodes A, B, C, D has passed any of the calibration test, first calibration experiment or second calibration experiment, the system may flag the qubit parameter corresponding to node A as being within specification, return to step 302 and perform a calibration test on node B.

Figure 4:
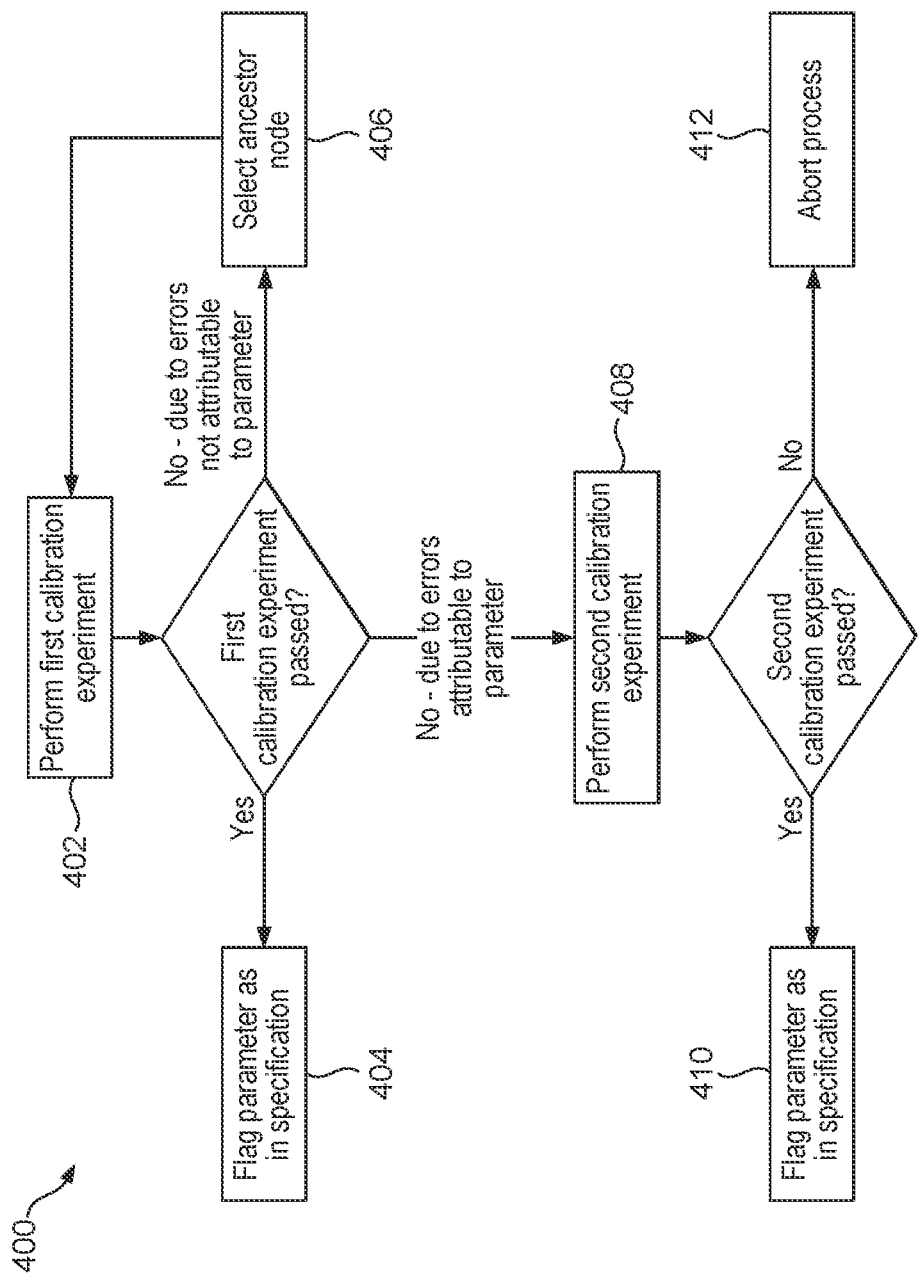
FIG. 4 is a flow diagram of an example process for qubit calibration.

FIG. 4 is a flow diagram of an example process 400 for performing a diagnostic calibration algorithm on a set of qubit parameters. For convenience, the process 400 will be described as being performed by a system of one or more classical or quantum computing devices located in one or more locations. For example, a qubit calibration system, e.g., the qubit calibration system 104 of FIG. 1, appropriately programmed in accordance with this specification, can perform the process 400. The example process 400 may traverse a directed graph that represents qubit parameters and their dependencies by starting at a particular node and working backwards through the dependencies of the node. The example process may assume that current or recent information regarding the system can no longer be trusted in a region near a node that calls the process. Therefore, the process 400 may traverse the graph entirely without the use of calibration tests and with the use of first and second calibration experiments. Log data may be recorded during the process 400, e.g. to record which calibration experiments have been performed and which qubit parameters were checked or updated, as well as the results of the calibration experiments.

The process 400 is an iterative process that includes iteratively performing one or more of the first calibration experiment and second calibration experiment on the qubit parameter and qubit parameters that correspond to an ancestor node of the node of the qubit parameter until the qubit parameter and qubit parameters that correspond to an ancestor node of the node of the qubit parameter are determined to be within specification or the process is aborted. The process 400 may be be iteratively performed until the qubit parameters that have failed the first calibration experiment, e.g., due to errors not attributable to the parameter, and qubit parameters that correspond to an ancestor node of the node of the qubit parameter that has failed the first calibration experiment are determined to be within specification.

The system performs a first calibration experiment on the qubit parameter (step 402). For example, if the directed graph is acyclic and includes nodes A, B and D, where A is the root node, node B depends on node A and node D depends on node B, where node D has failed the first calibration experiment due to errors not attributable to the parameter represented by node D, the system may perform a first calibration experiment on the qubit parameter corresponding to node D. Performing a first calibration experiment is described in more detail above with reference to FIG. 3.

The system may determine whether the first calibration experiment on the qubit parameter has passed or not. In response to determining that the qubit parameter passes the first calibration experiment, the system flags the parameter as a parameter that is within specification (step 404).

In response to determining the qubit parameter fails the first calibration experiment due to errors that are not attributable to the parameter, the system selects an ancestor parameter as the qubit parameter (step 406). Errors that are not attributable to a parameter are described above with reference to FIG. 3. Continuing the example above, if it is determined at step 406 that the qubit parameter corresponding to node D in the sequence of nodes A, B, D has failed the first calibration experiment due to errors that are not attributable to the parameter corresponding to node D, the system may select an ancestor node of node D, e.g., node B, return to step 402 and perform a first calibration experiment on the ancestor node, e.g., node B.

In some examples, if the process 400 is performed on a root node of the directed graph, e.g., a node that does not have an ancestor parameter, and it is determined at step 406 that the first calibration experiment has failed due to errors not attributable to the parameter corresponding to the root node, the system may determine a system failure.

In response to determining the qubit parameter fails the first calibration experiment due to errors that are attributable to the parameter, the system performs the second calibration experiment on the qubit parameter (step 408). For example, continuing the example above, if it is determined in that the first calibration experiment performed on the qubit parameter corresponding to node D has failed due to errors attributable to the parameter corresponding to node D, the system performs a second calibration experiment on the qubit parameter corresponding to node D. Errors that are attributable to a parameter and performing second calibration experiments are described above with reference to FIG. 3.

In response to determining the qubit parameter passes the second calibration experiment, the system flags the parameter as a parameter that is within specification (step 410). In response to determining the qubit parameter fails the second calibration experiment, the system aborts the processing of the parameters in the set of qubit parameters (step 412).

Figure 5A:
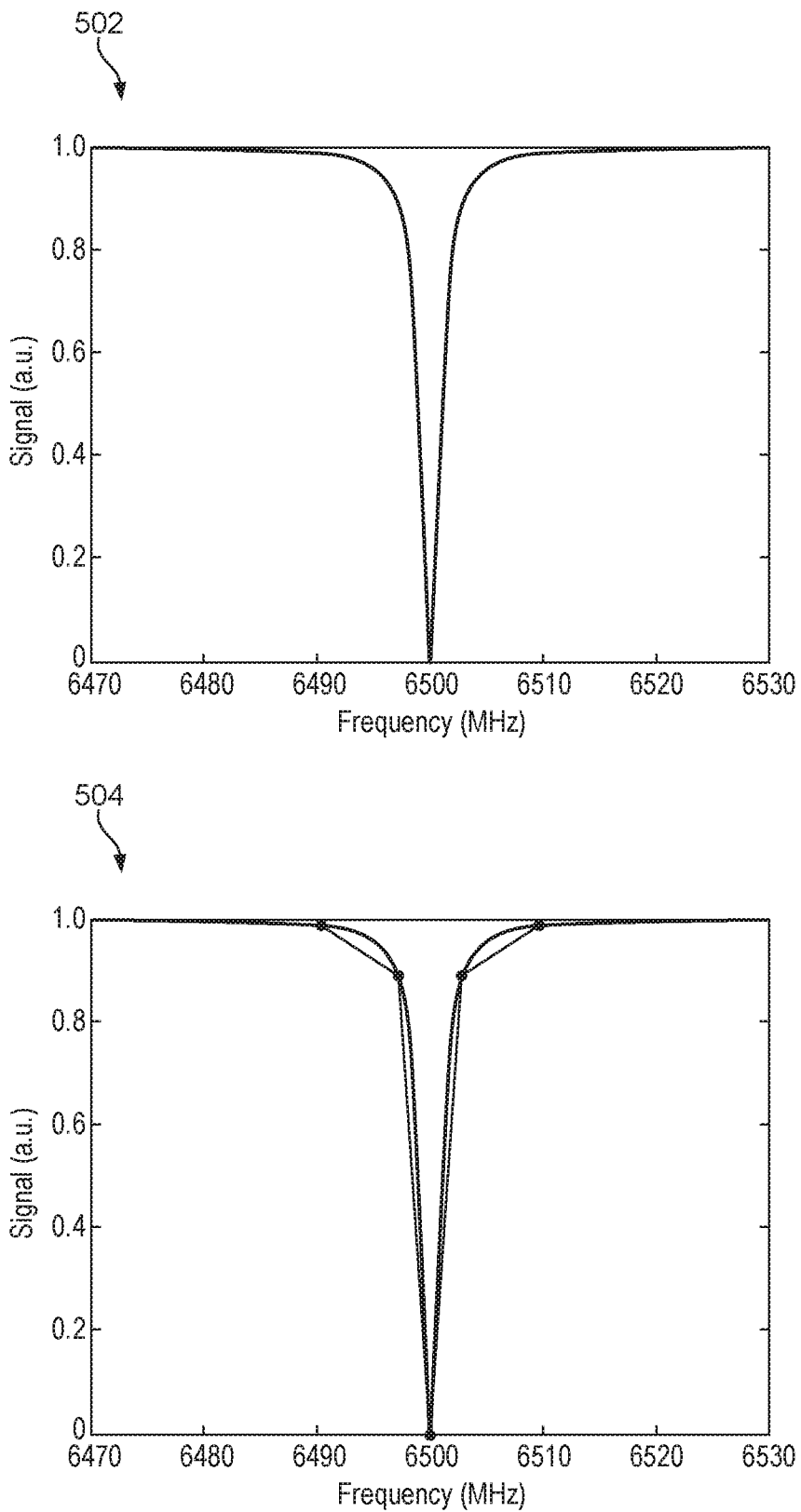
FIGS. 5A and 5B show example illustrations of calibrating a resonance frequency using a first and second calibration experiment.
Figure 5A:
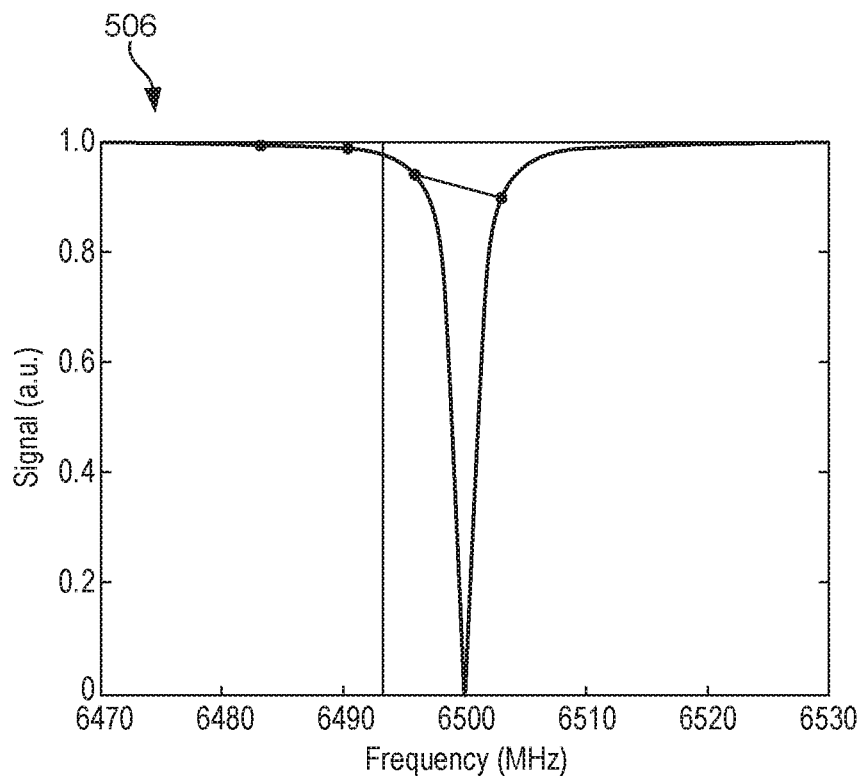
Figure 5A:
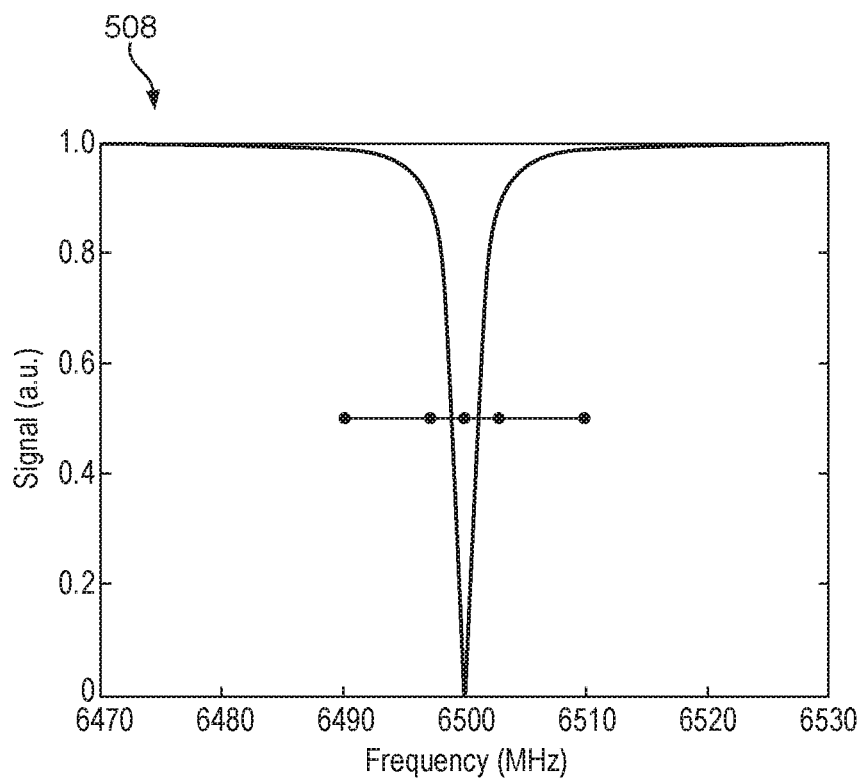
Figure 5B:
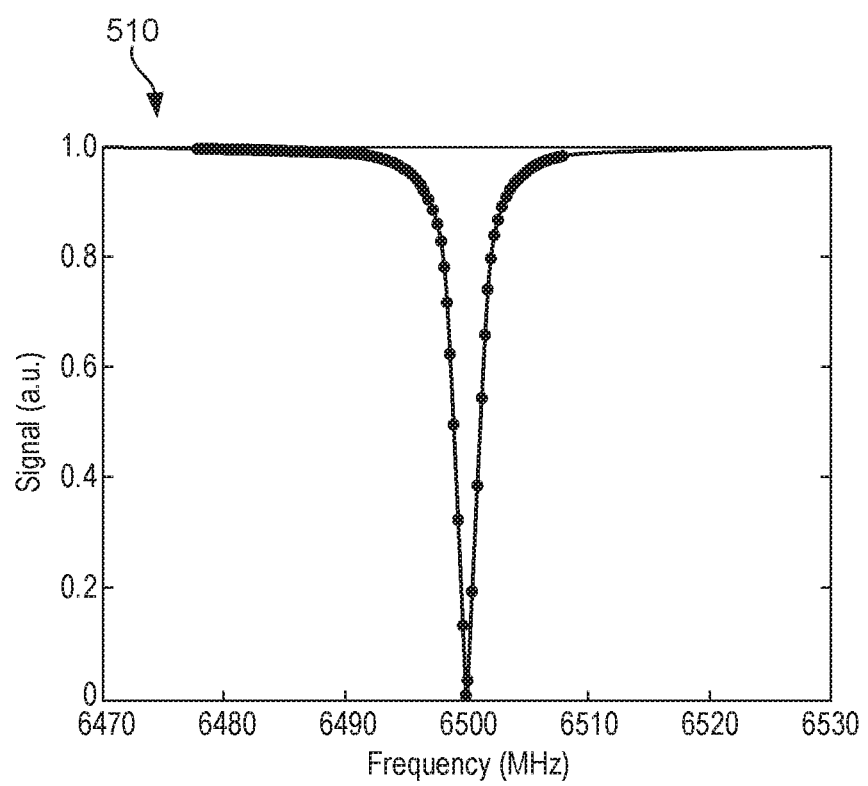

FIGS. 5A and 5B show example illustrations 502-510 of calibrating a resonance frequency using a first and second calibration experiment, as described above with reference to FIGS. 3 and 4 and as performed by a qubit calibration system, e.g., the qubit calibration system 104 of FIG. 1.

In order to determine an initial readout frequency for a qubit, it may be physically required to perform an ensemble of experiments of a readout pulse and search for a Lorentzian frequency response of the readout resonator. Illustration 502 shows an ideal Lorentzian frequency response of a readout resonator centered at 650 MHz.

Performing a first calibration experiment to the qubit may be used to verify that the resonator frequency is within specification, e.g., within a given range around 6500 MHz, or out of specification. Since the first calibration experiment may be a low cost ensemble of experiments, instead of taking a large number of data points, the system may take a small number of data points, e.g., 5 data points using 5 experiments, centered about the expected resonance frequency of 6500 MHz. Illustration 504 illustrates 5 data points using 5 experiments. The resulting data may suggest that the resonance frequency is where it is expected to be, e.g., at or close to 6500 MHz. In this case, the first calibration experiment would return "true", e.g., the parameter has passed the first calibration experiment. The log data store 108 is updated based on the first calibration experiment, including recording the result of the experiment and storing the measurement data (5 data points) obtained in the log data store 108.

If, for example, the resonator frequency had been previously calibrated to be at 6493 MHz and the first experiment was performed, the system may produce illustration 506, wherein the circle bullets represent the outputs from the 5 experiments, as in illustration 504, and the vertical line represents the expected frequency of the resonator, e.g., 6493 MHz. In this case, the first experiment would indicate that the resonator frequency is not as expected, e.g., not at 6500 MHz, and the first calibration experiment would return "false", e.g., the parameter has failed the first calibration experiment due to errors that are not attributable to the parameter. The log data store 108 is updated based on the experiment, including recording the result of the experiment and storing the measurement data obtained in the log data store 108.

As another example, in some cases a readout device may not be functioning, e.g., due to faulty hardware. In this case, if the first experiment was performed, the system may produce illustration 508. The data shown in illustration 508 is nonsensical—the readout device is always returning 0.5, independent of the frequency. In this case, the first experiment would return "false", e.g., the calibration experiment failed due to errors that are not attributable to the parameter—rather the errors are attributable to the readout device. In such cases, it may not be possible to verify whether the parameter is in specification or not. In some implementations the system may assume that the parameter is not within specification. The log data store 108 is updated based on the experiment, including recording the result of the experiment and storing the measurement data obtained in the log data store 108.

Illustration 510 shows the results of a second calibration experiment used to calibrate the resonance frequency. As described above with reference to FIGS. 3 and 4, a second calibration experiment may include running an ensemble of experiments and using the data from the experiments to update the parameter associated with the node. Illustration 510 shows the results of performing the ensemble of experiments to determine the resonator frequency. The log data store 108 is updated based on the experiment, including recording how much the updated value changed the previous value, and storing the measurement data in the log data store 108.

As described above various data may be stored in the log data store 108 during execution of the automatic qubit calibration process. Without limitation, in various implementations log data may be stored in the log data store 108 to record: what nodes were interacted with, in what order; ways that notes were interacted with (e.g. calibration test, first calibration experiment, second calibration experiment); the times that nodes were interacted with; the results of calibration procedures performed; measured data; whether the measured data was in or out of specification; whether parameters were updated, and how much any updated parameters modified the saved value.

Training a Supervised Learning Model

Figure 6:
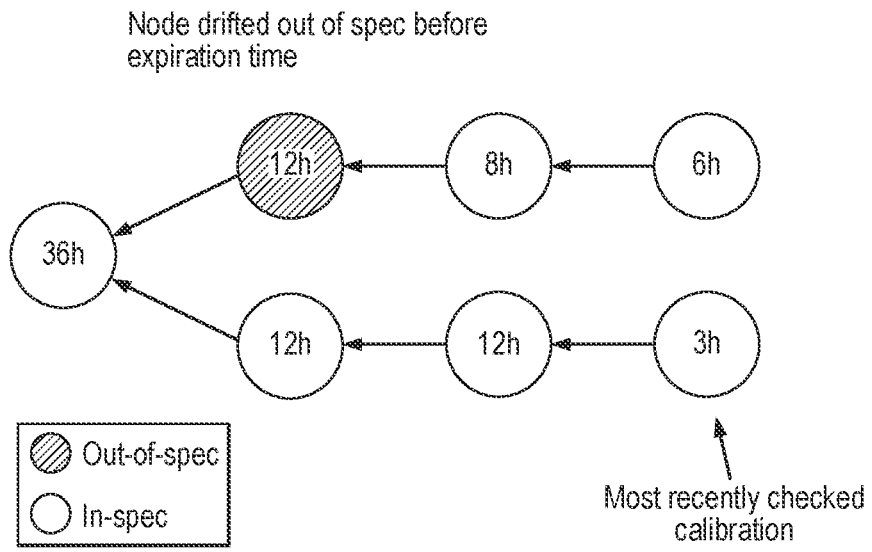
FIG. 6 shows an example dependency graph with nodes denoted by expiration time.

As noted above, an expiration time may be manually assigned to each node, to ensure calibrations are rerun as they expire (expiration may occur due to drift in physical parameters of the system such as magnetic flux seen by a qubit SQUID loop, etc). However if an unexpired calibration node goes out of specification, stable operation of the system may be lost. FIG. 6 shows an example dependency graph with nodes denoted by expiration time. If expiration times are set too long, loss of control can result, leading to lost time taking data on an uncalibrated system. The other extreme of setting times too short is also expensive as unnecessary time is spent running calibrations rather than using the system to perform computations. Assigning expiration times in an efficient way is further complicated by the fact that different samples and/or different qubits on the same sample may drift differently. If the system drifts out of spec, a full graph traversal may become necessary to diagnose the problem. Moreover while check measurements (such as the first calibration experiment described above) can be run on nodes to determine if they are out of specification this has a performance cost (through the time spent performing additional measurements).

In example implementations log data that is recorded during operation of the automatic qubit calibration process described above is used to train a supervised learning model to address at least some of the above-described problems. More specifically, training data is selected from the log data and used to train a supervised learning model to select one or more qubit parameters to be calibrated and/or checked (e.g. by selecting a node on the graph that is in need of calibration).

The supervised learning model may be trained to infer that a node needs to be calibrated at a particular time, based on knowledge of one or more prior calibration procedures that have been performed and/or information relating to the result of previously performed calibration procedures. For example, drifts of specific nodes may affect check experiments down the line in distinctive ways that can be recognized through a supervised learning model, as discussed in more detail below.

Once the model is trained, a qubit calibration procedure may be selected using the supervised learning model, rather than perform a full graph traversal. This may speed up calibration times, by "jumping" directly to nodes that may need to be calibrated. In this way unnecessary experiments and data processing may be avoided.

In one example, the supervised learning model may be trained to estimate the probability that failure of one node is caused by one or more other nodes (e.g. due to miscalibration of the one or more other nodes). In this case, the supervised learning model may comprise a Bayesian model, and the training data may comprise frequency of calibration failures for (1) individual nodes and (2) node combinations. Hence, the supervised learning model may, in some cases, "jump" to a particular node which needs to be calibrated and thereby reach this node without the need to perform the diagnostic algorithm 400 or execute a full traversal of the graph. In some examples the probabilistic model may be configured to derive probabilities based on the training data using maximum likelihood estimation and/or a smoothed probability estimator.

More specifically, a matrix may be built up on the directed graph that indicates, given that a node is failing, what is the probability that each other node on the graph is to blame. This probability may be derived using Bayes' rule, where A, B refer to a failure of a first calibration experiment on nodes A, B: $P(A|B)=P(A \text{ and } B)P(A)/P(B)$. The probabilities may be extracted by consulting the log data store 108 and dividing failures by the total number of measurements.

By determining the Bayesian probability of each node relative to each other node built up over many recalibrations, inferences can be made about where on the graph to jump, without needing to perform a full traversal. The transition from the automatic qubit calibration process to inferred behaviour based on the model could be made to begin once P(A|B) becomes suitably defined (due to presence of data) and the number of events used to calculate it is above an operator-selected threshold (say 50 events)

In another example, the supervised learning model may be trained to recognise one or more patterns or distinctive features in measurement data relating to a first node which indicate that one or more other nodes are causing the first node to fail. In particular, drifts of specific nodes may affect the measured data at the first node in distinctive ways that can be recognized by the model.

In this case, selecting training data from the log data comprises selecting training examples which respectively comprises: (1) measurement data relating to a calibration experiment carried out for a node (e.g. one or more data points); and (2) an indication of the results of a qubit calibration procedure for one or more other nodes.

Hence, a model may be trained that maps measured data from a node to a probability for each other node denoting how sure we are that it is causing the failure, given how the measured data looks. More specifically, the supervised learning model may be trained to map from a space of possible measurement results (e.g. all possible data points) to the space of all nodes on the graph (this may be represented as a vector space in which each dimension is a node in the graph). In this example, the supervised learning model may comprise a neural network or other multilayer network, which may be trained in accordance with the backpropagation algorithm as more log data is built up.

In a further example, the supervised learning model may be trained to determine, given a node's age (i.e. the time that has elapsed since it was last calibrated), an estimate of the probability that the node has failed (e.g. no longer in specification). In this case, selecting training data from the log data may include selecting training examples which respectively include (1) an indication that a calibration procedure for a node has failed; and (2) the time that has elapsed since the failed node was last calibrated. By histogramming node failures versus the time that has elapsed since the failed node was last calibrated, and fitting a probability density function (or cumulative distribution function) to the resulting histogram, a supervised learning model may be trained which deduces the "root-most" node that is most likely to have failed upon initiating a calibration procedure. The supervised learning model may also be used to set timeout periods for nodes, i.e. train the timeout periods based on data.

A combination of the data provided by supervised learning models trained in accordance with the examples discussed herein may be used to make a decision about which calibrations to run preemptively (when they are likely to have expired) and which to run when the system in unhealthy in an attempt to diagnose an error.

Figure 7:
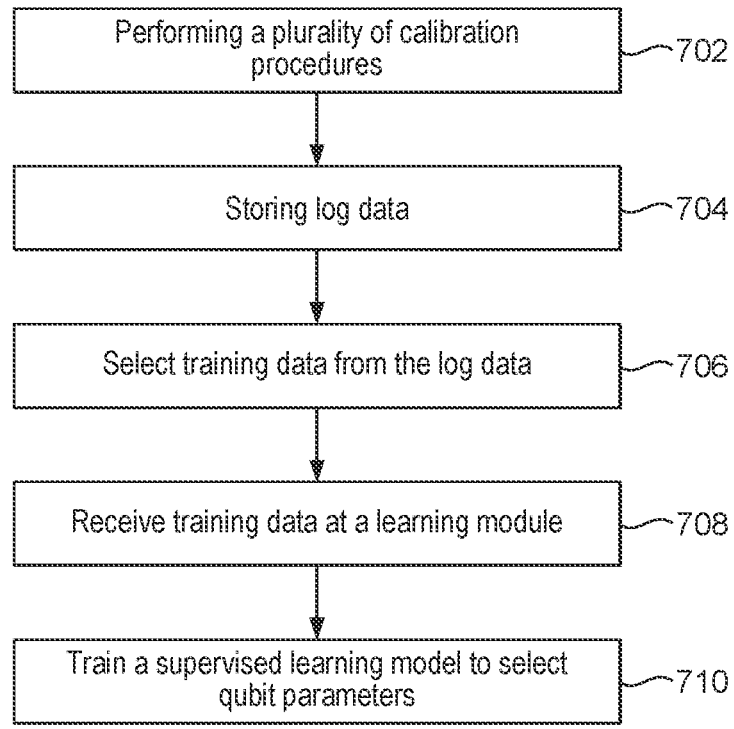
FIG. 7 illustrates steps of a method for training a supervised learning model.

FIG. 7 illustrates steps of a method for training a supervised machine learning model in accordance with various example implementation described herein. As shown in step 702, a plurality of qubit calibration procedures are performed. The qubit calibration procedures may be performed in accordance with an automatic qubit calibration process. In step 704, log data is stored comprising at least: a record identifying one or more calibration procedures that have been performed, and information relating to the result of the respective calibration procedures. In step 706, training data is selected from the log data. Selecting training data from the log data may comprise compiling the relevant data into data structures suitable for training a supervised machine learning algorithm. In step 708, the training data is received at the learning module 110. In step 710, the learning model trains a supervised machine learning model to select qubit parameters to be calibrated and/or checked based on the training data that has been selected from the log data.

In some examples, the data that is logged may be sparse, and hence, measurements may be performed in order to map out areas of potential interest. For example, a measure of the amount of log data which is stored relating to the current operating state of the system may be determined, and one or more calibration procedures may be performed in dependence on the determined measure of the amount of log data which is stored relating to the current operating state, e.g. if the determined measure of the amount of log data is below a threshold.

A variety of learning models may be used in addition to those described above. Examples include linear regression models, neural networks, regression trees, support vector machines, classifiers, and other appropriate models.

Although various implementations have been described in the context of an automatic qubit calibration process based on a directed acyclic graph, this is not intended to be limiting. Any calibration of a physical system will consist of running calibrations in some order, taking and analyzing data, and performing parameter updates. A dataset containing at least a selection of this information can be used for training a supervised learning algorithm in accordance with the teachings herein.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, the reference to these arrangements of operations in terms of modules should not be considered to imply a structural limitation and references to functional names is by way of illustration and does not infer a loss of generality.

Certain aspects of the present invention include process steps and instructions described herein in the form of an algorithm. It should be understood that the process steps, instructions, of the present invention as described and claimed, are executed by computer hardware operating under program control, and not mental steps performed by a human. Similarly, all of the types of data described and claimed are stored in a computer readable storage medium operated by a computer system, and are not simply disembodied abstract ideas. In addition, the present invention is not described with reference to any particular programming language. It will be appreciated that a variety of programming languages may be used to implement the teachings of the present invention as described herein.

The present invention also relates to a computing apparatus for performing the computing operations described herein. This computing apparatus may be specially constructed for the required purposes, or it may comprise a general-purpose computer selectively activated or reconfigured by a computer program stored on a computer readable medium that can be executed by the computer. The computing apparatus referred to in the specification may include a single processor or may be architectures employing multiple processor designs for increased computing capability.

Implementations of the quantum subject matter and quantum operations described in this specification may be implemented in suitable quantum circuitry or, more generally, quantum computational systems, including the structures disclosed in this specification and their structural equivalents, or in combinations of one or more of them. The term "quantum computational systems" may include, but is not limited to, quantum computers, quantum information processing systems, quantum cryptography systems, or quantum simulators.

The terms quantum information and quantum data refer to information or data that is carried by, held or stored in quantum systems, where the smallest non-trivial system is a qubit, e.g., a system that defines the unit of quantum information. It is understood that the term "qubit" encompasses all quantum systems that may be suitably approximated as a two-level system in the corresponding context. Such quantum systems may include multi-level systems, e.g., with two or more levels. By way of example, such systems can include atoms, electrons, photons, ions or superconducting qubits. In many implementations the computational basis states are identified with the ground and first excited states, however it is understood that other setups where the computational states are identified with higher level excited states are possible. It is understood that quantum memories are devices that can store quantum data for a long time with high fidelity and efficiency, e.g., light-matter interfaces where light is used for transmission and matter for storing and preserving the quantum features of quantum data such as superposition or quantum coherence.

Quantum circuit elements may be used to perform quantum processing operations. That is, the quantum circuit elements may be configured to make use of quantum-mechanical phenomena, such as superposition and entanglement, to perform operations on data in a non-deterministic manner. Certain quantum circuit elements, such as qubits, may be configured to represent and operate on information in more than one state simultaneously. Examples of superconducting quantum circuit elements that may be formed with the processes disclosed herein include circuit elements such as co-planar waveguides, quantum LC oscillators, qubits (e.g., flux qubits or charge qubits), superconducting quantum interference devices (SQUIDs) (e.g., RF-SQUID or DCSQUID), inductors, capacitors, transmission lines, ground planes, among others.

In contrast, classical circuit elements generally process data in a deterministic manner. Classical circuit elements may be configured to collectively carry out instructions of a computer program by performing basic arithmetical, logical, and/or input/output operations on data, in which the data is represented in analogue or digital form. In some implementations, classical circuit elements may be used to transmit data to and/or receive data from the quantum circuit elements through electrical or electromagnetic connections. Examples of classical circuit elements that may be formed with the processes disclosed herein include rapid single flux quantum (RSFQ) devices, reciprocal quantum logic (RQL) devices and ERSFQ devices, which are an energy-efficient version of RSFQ that does not use bias resistors. Other classical circuit elements may be formed with the processes disclosed herein as well.

During operation of a quantum computational system that uses superconducting quantum circuit elements and/or superconducting classical circuit elements, such as the circuit elements described herein, the superconducting circuit elements are cooled down within a cryostat to temperatures that allow a superconductor material to exhibit superconducting properties.

While this specification contains many specific implementation details, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. For example, the actions recited in the claims can be performed in a different order and still achieve desirable results. In certain circumstances, multitasking and parallel processing may be advantageous. Moreover, the separation of various components in the implementations described above should not be understood as requiring such separation in all implementations.

A number of implementations have been described. Nevertheless, it will be understood that various modifications may be made within the scope of the following claims.

The invention claimed is:

1. A method, comprising:
    causing a plurality of qubit calibration procedures to be performed on one or more qubits in accordance with an automatic qubit calibration process, wherein
        the one or more qubits are associated with qubit parameters for controlling qubit control hardware or qubit measurement hardware;
        the automatic qubit calibration process is operated in accordance with a directed graph comprising a plurality of nodes and edges, each node of the graph relating to at least one qubit parameter and each edge defining a dependency of one qubit parameter on another; and
        the automatic qubit calibration process traverses the directed graph by starting at a first node in the graph and working backwards through the dependencies of the node, wherein at each node one or more calibration procedures are performed on a qubit parameter relating to the node;
    storing log data comprising at least:
        a record identifying one or more calibration procedures that have been performed, and
        information relating to a result of each of the one or more calibration procedures that have been performed;
    selecting training data from the log data, the training data comprising multiple training examples, wherein each training example comprises data relating to a calibration procedure that was performed on a qubit parameter and an indication of a result of the calibration procedure that was performed on the qubit parameter;
    receiving the training data at a learning module operating at one or more computing devices; and
    training, at the learning module and by supervised learning, a supervised learning model to select qubit parameters to be calibrated and/or checked, wherein the supervised learning model is trained using the training examples in the training data that has been selected from the log data and selecting the qubit parameter to be calibrated and/or checked comprises selecting a node of the directed graph.

2. The method according to claim 1, wherein selecting training data from the log data comprises selecting training examples which respectively comprise:
   measurement data relating to a calibration experiment carried out for a qubit parameter relating to a node; and
   an indication of the result of a qubit calibration procedure for one or more other qubit parameters that relate to respective nodes,
   wherein the supervised learning model is trained, using the training data, to identify one or more qubit parameters that relate to second nodes which are causing a qubit parameter that relates to a first node to fail, based on measurement data obtained from a calibration experiment for the qubit parameter that relates to the first node.

3. The method according to claim 2, wherein the supervised learning model is configured by training to identify one or more patterns or distinctive features in the measurement data obtained from the calibration experiment for the qubit parameter that relates to the first node to identify the one or more qubit parameters that relate to the second nodes.

4. The method according to claim 2, wherein the supervised learning model comprises a neural network, wherein the neural network is trained using backpropagation.

5. The method according to claim 1, wherein the supervised learning model is a Bayesian model, the training data comprising frequency of calibration failures for (1) qubit parameters that relate to individual nodes and (2) qubit parameters that relate to node combinations, thereby to train the Bayesian model to estimate a probability that failure of one qubit parameter that is related to a respective node is caused by one or more other qubit parameters that are related to other nodes.

6. The method according to claim 5, wherein the probabilistic Bayesian model is configured to derive probabilities based on the training data using maximum likelihood estimation and/or a smoothed probability estimator.

7. The method according to claim 1, wherein selecting the training data from the log data comprises selecting training examples which respectively include:
   an indication that a calibration procedure for a qubit parameter that relates to a node has failed; and
   a time that has elapsed since a failed qubit parameter that relates to the node was last checked or calibrated,
   wherein the supervised learning model is thereby trained to determine, given a time that has elapsed since a qubit parameter that relates to a node was last checked or calibrated, an estimate of a probability that a calibration procedure carried out on the qubit parameter that relates to the node will fail.

8. The method according to claim 7, comprising histogramming node failures versus the time that has elapsed since the failed qubit parameter that relates to the node was last checked or calibrated.

9. The method according to claim 7, comprising determining timeout periods for one or more qubit parameters that related to the nodes using the supervised learning model.

10. The method according to claim 1, wherein the directed graph is a directed acyclic graph.

11. The method according to claim 1, wherein storing log data for a group of one or more related calibration procedures comprises storing one or more of:
   an indication of the nodes that were interacted with;
   an indication of an order in which nodes were interacted with;
   an indication of the calibration procedures that were performed;
   an indication of times at which nodes were interacted with;
   measured data;
   an indication of whether the measured data was in or out of specification;
   an indication of whether parameters were updated from a saved value; and
   a measure of an extent to which any updated parameters modified the saved value.

12. The method according to claim 1, wherein each qubit calibration procedure comprises one of:
   a calibration test, in which calibration of at least one qubit parameter is checked without carrying out an experiment, wherein calibration of the at least one qubit parameter is checked based at least in part on the results of one or more previous qubit calibration procedures;
   a first calibration experiment in which calibration of at least one qubit parameter is checked by:
      obtaining data by carrying out one or more experiments on one or more qubits; and
      comparing the obtained data to one or more reference data sets; and
   a second calibration experiment comprising:
      obtaining data by carrying out one or more experiments on one or more qubits;
      obtaining one or more values for one or more qubit parameters, comprising fitting said one or more values to at least part of the obtained data, using a fitter algorithm; and
      updating stored values for a qubit parameter with one or more of the respective fitted values.

13. The method according to claim 1, further comprising:
   halting operation of the automatic qubit calibration process;
   selecting, using the supervised learning model, a qubit parameter to be calibrated and/or checked; and
   performing a qubit calibration procedure to calibrate and/or check the selected qubit parameter.

14. The method according to claim 13, wherein the automatic qubit calibration process is halted in dependence on a training metric exceeding a predetermined threshold.

15. The method according to claim 1, wherein storing log data comprises storing knowledge relating to an operating state of a system that comprises the one or more qubits, wherein the training data is selected to train the supervised learning model to select a qubit calibration to be performed in dependence on knowledge relating to the operating state of the system.

16. The method according to claim 15, comprising:
   determining a measure of an amount of log data which is stored relating to the current operating state of the system; and
   performing one or more calibration procedures in dependence on the determined measure of the amount of log data which is stored relating to the current operating state.

17. The method according to claim 1, wherein the one or more qubits comprise one or more superconducting qubits.

18. The method according to claim 1, wherein the one or more qubits comprise a system based on at least one of: a superconducting qubit, a system based on one or more ion traps, quantum dots, neutral atoms, rydberg states, solid-state defects, molecules, photons, or an ensemble comprising multiple copies of such a system.

19. An apparatus comprising one or more computers and one or more storage devices storing instructions that are operable, when executed by the one or more computers, to cause the one or more computers to carry out operations comprising:

causing a plurality of qubit calibration procedures to be performed on one or more qubits in accordance with an automatic qubit calibration process, wherein the automatic qubit calibration process is operated in accordance with a directed graph comprising a plurality of nodes and edges, each node of the graph relating to at least one qubit parameter and each edge defining a dependency of one qubit parameter on another, and the automatic qubit calibration process traverses the directed graph by starting at a first node in the graph and working backwards through the dependencies of the node, wherein at each node one or more calibration procedures are performed on a qubit parameter relating to the node;

storing log data comprising at least:

a record identifying one or more calibration procedures that have been performed, and information relating to a result of each of the one or more calibration procedures that have been performed;

selecting training data from the log data, the training data comprising multiple training examples, wherein each training example comprises data relating to a calibration procedure that was performed on a qubit parameter and an indication of a result of the calibration procedure that was performed on the qubit parameter;

receiving the training data at a learning module operating at one or more computing devices; and training, at the learning module and by supervised learning, a supervised learning model to select qubit parameters to be calibrated and/or checked, wherein the supervised learning model is trained using the training examples in the training data that has been selected from the log data and selecting the qubit parameter to be calibrated and/or checked comprises selecting a node of the directed graph.

\* \* \* \* \*